United States Patent
Parson et al.

(10) Patent No.: US 7,885,915 B2
(45) Date of Patent: Feb. 8, 2011

(54) ANALYTICAL SYSTEM FOR DISCOVERY AND GENERATION OF RULES TO PREDICT AND DETECT ANOMALIES IN DATA AND FINANCIAL FRAUD

(75) Inventors: Rupert D. G. Parson, London (GB);
John D. G. Andersson, Brighton (GB);
Timothy Ball, Tunbridge Wells (GB);
Wael Khatib, Tunbridge Wells (GB);
Patrick Rene Tschorn, Tunbridge Wells (GB); Stephen Muggleton, London (GB)

(73) Assignee: Future Route Limited, London (GB)

( * ) Notice: Subject to any disclaimer, the term of this patent is extended or adjusted under 35 U.S.C. 154(b) by 1171 days.

(21) Appl. No.: 11/453,254

(22) Filed: Jun. 15, 2006

(65) Prior Publication Data
US 2007/0027674 A1    Feb. 1, 2007

Related U.S. Application Data

(60) Provisional application No. 60/691,805, filed on Jun. 20, 2005.

(51) Int. Cl.
*G06F 17/00*    (2006.01)
*G06N 5/02*    (2006.01)
(52) U.S. Cl. ........................................................ 706/47
(58) Field of Classification Search .................. 706/47, 706/56, 59
See application file for complete search history.

(56) References Cited

U.S. PATENT DOCUMENTS

| | | | | |
|---|---|---|---|---|
| 6,782,377 | B2 * | 8/2004 | Agarwal et al. | 706/47 |
| 7,627,543 | B2 * | 12/2009 | Lock et al. | 706/47 |
| 2007/0289013 | A1 * | 12/2007 | Lim | 726/22 |

OTHER PUBLICATIONS

Fayyad, Usama M. and Irani, Keki B., "What Should Be Minimized in a Decision Tree?", Proceedings of the Eighth National Conference on Artificial Intelligence AAAI-90, pp. 749-754 (Fayyad et al.).*
Senator et al., "The Financial Crimes Enforcement Network IA System (FAIS), Identifying Potential Money Laundering from Reports of Large Cash Transactions", Am. Assoc. for Artificial Intelligence, 1995, 0738-4602-1995.*
Murthy, Sreerama K., "Automatic Construction of Decision Trees from Data: A Multi-Disciplinary Survey", Data Mining and Knowledge Discovery, vol. 2, No. 4, Dec. 1998, pp. 345-389.*

(Continued)

*Primary Examiner*—Donald Sparks
*Assistant Examiner*—Vincent M Gonzales
(74) *Attorney, Agent, or Firm*—Nixon & Vanderhye, PC

(57) ABSTRACT

Methods and computer apparatus are disclosed for deriving first order logic language rules for use in analyzing new data to identify anomalies in the new data. Historical data is formatted to be in a form suitable for application of a machine-learning algorithm thereto. The machine-learning algorithm is applied to the formatted historical data to generate a set of first order logic language rules that cover the formatted historical data. The set of first order logic language rules are analyzed to obtain a subset of said set of first order logic language rules which can be used as first order logic language rules in analyzing new data.

21 Claims, 8 Drawing Sheets

OTHER PUBLICATIONS

Stahl et al., "Two Methods for Improving Inductive Logic Programming Systems", Machine Learning, Lecture Notes in Computer Science vol. 667/1993, available at http://www.springerlink.com/content/yuw37567412520g6/ (accessed jan. 8, 2010).*

Kim, H and Koehler, GJ, "Theory and Practice of Decision Tree Induction", Omega, Int. J. Mgmt Sci. vol. 23, No. 6, pp. 637-652, 1995.*

Tom Fawcett and Foster Provost, "Adaptive Fraud Detection", Data Mining and Knowledge Discovery 1, pp. 291-316 (1997).*

Ito et al, "Finding Hypotheses from Examples by Computing the Least Generalization of Bottom Clauses", LNAI DS'98, vol. 1532, Dec. 31, 1998, pp. 303-314, XP002442003.

Yang et al, "First-Order Rules Mining Guided by Information Gain", LNCS Foundations of Intelligent Systems, vol. 2871, Oct. 7, 2003, pp. 463-467, XP002441996.

Wnek et al, "Hypothesis-Driven Constructive Induction in AQ17-HCI: A Method and Experiments", Machine Learning, Kluwer Academic Publishers-Plenum Publishers, NE, vol. 14, No. 2, Feb. 1, 1994, pp. 139-168, XP019213237; ISSN: 1573-0565.

Langley et al "Applications of Machine Learning and Rule Induction", Communications of the ACM, vol. 38, No. 11, Dec. 31, 1995, pp. 54-64, XP002441998.

* cited by examiner

Given a set of examples E & background knowledge B

Generate a set of rules H, which explain examples E

Promote Left-Left grandchild:

Promote Left-Right grandchild:

Promote Right-Left grandchild:

Promote Right-Right grandchild:

ANALYTICAL SYSTEM FOR DISCOVERY AND GENERATION OF RULES TO PREDICT AND DETECT ANOMALIES IN DATA AND FINANCIAL FRAUD

PRIORITY CLAIM

This application claims priority to U.S. Provisional Patent Application No. 60/691,805, filed Jun. 20, 2005, the entire contents of which is incorporated herein by reference In this specification, various headings and sub-headings have been used. It should be noted that the headings and sub-headings have been used merely for reasons of clarity and convenience and are not intended to have any legal effect.

FIELD OF THE INVENTION

The present invention relates to a method of deriving first order logic language rules for use in analysing new data to identify anomalies in the new data, a method of detecting fraudulent financial transactions in a group of new financial transactions, a method of detecting data quality anomalies in a set of new data, computer programs containing program instructions for causing a computer to carry out such methods, and computer apparatus constructed and arranged to carry out such methods.

BACKGROUND OF THE INVENTION

Enterprises are increasingly using rule-based systems in order to manage many and various aspects of their businesses. Rule-based systems have been used in a multitude of applications, including: detecting credit card fraud, data quality, lending and credit approval, insurance, securities and capital markets trading cycle, manufacturing operations, telecommunications, logistics, transportation and travel, government, and retail.

Typically, in the prior art, the rules that are used in these systems are created manually through a defined process of analysis, construction, and approval cycle by a group of (human) domain experts. Such manual rule generation, testing, and maintenance can be a challenging proposition. Such rules: require deep (human) domain expertise in addition to specialised skills in data processing; require long lead times to set up; are difficult to maintain in a consistent and clean manner; are inherently focused on prescribing behaviour by replicating past trends as observed in specific instances, making them less able to capture new trends and require constant maintenance; and are generated over a period of time with input from different human experts, creating inconsistencies and reducing accuracy.

By way of example, financial fraud takes many forms, including for example transactional fraud, such as credit card or debit card fraud, application fraud, cash card/ATM fraud etc. A particular example discussed herein is that of credit card fraud. However, the basic principles on which these different types of fraud rely are generally the same or similar for each of the types mentioned above. Consequently, the same basic principles of preferred embodiments of the present invention can be used in detection of these different types of frauds. In general, preferred embodiments of the present invention can be applied to the analysis of any type of human behaviour and/or attributes recorded in a computer system that may relate to a fraud event.

Financial institutions, such as banks, typically currently use a combination of transaction scoring and rule-based techniques to filter transactions and either accept, refer or decline them. Typically, scores are calculated using neural networks and the rules are generated by direct entry by (human) domain experts manually reviewing and creating rules. Transactions are tagged using a numeric score reflecting the likelihood of their being fraudulent. The method has had some impact, typically discovering 60% to 70% of frauds. However, most organisations also incur a high false positive rate, typically more than 15:1 and often as high as 20:1, which generates significant cost and customer dissatisfaction. The pressure to maintain low false positive rates means that even the best manual systems can suffer from high levels of undetected fraud. At the same time, there are increasing demands to handle more transactions, and criminals are becoming increasingly adept at identifying and exploiting new gaps in the processes. These issues all drive the need for a technical solution to the problem of creating and maintaining a set of rules to identify credit card fraud with the required high levels of detection and low false positive rates.

Rule-based systems are also widely used in the domain of data quality, including the identification of anomalies in data. Data quality is becoming increasingly important to monitor and improve. Many corporations and other organisations have invested large sums in building numerous data warehouses to support their information needs. Availability of information and reporting efficiency has been the key driver in their implementation. However, in order to derive more value, it is essential that more attention is paid to the quality of data that they contain. In addition, the regulatory requirements of for example Basel II and Sarbanes Oxley are demanding improvements in data quality. For instance, Basel II requires the collection and maintenance of 180+ fields from multiple source systems. In order to comply, it will be obligatory to follow the principles enforced by controlled definition and measurement. Furthermore, risk data quality improvements will have to be continually measured, controlled and aligned with business value.

Typical data quality systems require a library of business and data compliance rules which are used to measure and monitor the quality of data. The rules in these systems are created and maintained by human analysts, often requiring the assistance of expensive consultants. Because of the underlying complexity of the problem being addressed, the human-created rules suffer from inaccuracy in that they do not completely accurately identify all data quality issues. In addition, they quickly become out of date as the underlying business evolves, as it is not possible for human intervention to manually track the content and form of the underlying data, in the same way that it is not possible for humans to manually record and store the sort of volumes of data that are stored in large-scale modern databases.

It is becoming increasingly necessary, therefore, that the rules in data quality systems are created and maintained automatically by a technical solution.

SUMMARY OF THE PRESENT INVENTION

According to a first aspect of the present invention, there is provided a method of deriving first order logic language rules for use in analysing new data to identify anomalies in the new data, the method comprising:

formatting historical data to be in a form suitable for application of a machine-learning algorithm thereto;

applying the machine-learning algorithm to said formatted historical data to generate a set of first order logic language rules that cover said formatted historical data; and, analysing said set of first order logic language rules to obtain a subset of said set of first order logic language rules which can be used as first order logic language rules in analysing new data.

According to a second aspect of the present invention, there is provided a method of detecting fraudulent financial transactions in a group of new financial transactions, the method comprising:

formatting historical financial transaction data to be in a form suitable for application of a machine-learning algorithm thereto;

applying the machine-learning algorithm to said formatted financial transaction historical data to generate first order logic language rules that cover said formatted financial transaction historical data; and, applying the first order logic language rules to data relating to a group of new financial transactions in order to identify fraudulent financial transactions in the group of new financial transactions.

According to a third aspect of the present invention, there is provided a method of detecting data quality anomalies in a set of new data, the method comprising:

formatting historical data to be in a form suitable for application of a machine-learning algorithm thereto;

applying the machine-learning algorithm to said formatted historical data to generate first order logic language rules that cover the data quality anomalies found in said formatted historical data; and, applying the first order logic language rules to new data in order to identify the data quality anomalies in the new data.

The preferred embodiments of the present invention eliminate and/or reduce the problems of the essentially manual processes of the prior art and provide an automatic rules discovery process. In automating the rule discovery process, the present invention does not merely automate a process that was carried out manually in the past. The prior art process suffers from the deterioration of the rule set described above, and the rule sets created by hand are not optimal given the data. Preferred embodiments of the present invention represent a technological advance because the rule sets, which in a practical embodiment are created using software that analyses the computer data, offer a higher degree of accuracy combined with a lower false positive rate than achievable by human rule creation. Further, the volume of data that in practice is required to be analysed exceeds the feasibility of human intervention, and the exhaustive search process carried out by the preferred rule creation algorithms exceeds the technical ability of human experts. Indeed, the preferred embodiments of the present invention rely on having large amounts of data in order to achieve high accuracy. These large amounts of data make the problem intractable if carried out manually as in the prior art.

In a preferred embodiment of the second aspect, the method comprises: analysing the first order logic language rules generated by the machine-learning algorithm to obtain a subset of said first order logic language rules such that the subset can be used as the first order logic language rules that are applied to the data relating to a group of new financial transactions in order to identify fraudulent financial transactions in the group of new financial transactions.

In a preferred embodiment of the third aspect, the method comprises: analysing the first order logic language rules generated by the machine-learning algorithm to obtain a subset of said first order logic language rules such that the subset can be used as the first order logic language rules that are applied to the new data.

In a preferred embodiment of the third aspect, the method comprises: using the same data set both as the historical data and the new data, in order that the system can be used to detect data quality anomalies in data with no prior analysis required.

In the first aspect of the present invention and in the preferred embodiments of the second and third aspects of the present invention, the analysis of the rules generated by the machine-learning algorithm can perform rule specialisation while maintaining concise user-selectable performance criteria in order to reduce the number of rules while maintaining performance metrics that are acceptable to the user.

In any of the first three aspects, the rule generation algorithm can operate in real-time or in a batch process; asynchronously or interactively; and distributed across several processors or on a single processor.

In a preferred embodiment, the machine-learning algorithm is arranged so as to learn from relational attributes in the historical data. In this embodiment, relational attributes are typically used in addition to propositional attributes in the historical data.

In a preferred embodiment, the machine learning algorithm includes inductive logic programming.

The inductive logic programming may include universal single-parse induction via hypothesis tree building and refinement.

The machine learning algorithm may include an evolutionary algorithm. The evolutionary algorithm preferably includes at least one of genetic programming and a genetic algorithm. In one preferred embodiment, the evolutionary algorithm preferably uses a bottom clause that is generated from a subset of the historical data, said subset including plural examples from the historical data. In another preferred embodiment, the evolutionary algorithm uses a bottom clause that is generated from all examples from the historical data.

In one preferred embodiment, the formatting of the historical data forms a data field association tree. By joining columns that are most closely associated, the data field association tree can produce a compressive representation (i.e. a representation that effects compression) from which the original data can be reconstructed while at the same time indicating relationships in the data through a specialised information-theoretical analysis.

In an embodiment, the D-fat is constructed and restructured according to at least one user-defined criterion. This allows the user to tailor the construction and restructuring of the D-fat according to the user's needs and/or the nature of the data, which permits more effective and optimal analysis of the data according to the user's requirements. In one embodiment, the D-fat is first constructed and then restructured until the user-defined criterion is achieved. The construction may follow a fairly simple strategy for reasons of efficiency.

In an embodiment, the method comprises forming two D-fats, and comparing metrics for the two D-fats. This permits the user to be alerted in the case that there are significant differences in the underlying pattern in the corresponding sets of data (beyond for example an optional user-defined tolerance level).

In an embodiment, there is provided a computer program, optionally recorded on a carrier, containing program instructions for causing a computer to carry out any of the methods as described above.

According to a fourth aspect of the present invention, there is provided computer apparatus for deriving first order logic language rules for use in analysing new data to identify anomalies in the new data, the computer apparatus comprising:

a data formatting engine for formatting historical data to be in a form suitable for application of a machine-learning algorithm thereto;

a machine-learning engine for applying the machine-learning algorithm to said formatted historical data to generate a set of first order logic language rules that cover said formatted historical data; and, a rule analysis and refinement engine for analysing said set of first order logic language rules to obtain a subset of said set of first order logic language rules which can be used as first order logic language rules in analysing new data.

According to a fifth aspect of the present invention, there is provided computer apparatus for detecting fraudulent financial transactions in a group of new financial transactions, the computer apparatus comprising:

a data formatting engine for formatting historical financial transaction data to be in a form suitable for application of a machine-learning algorithm thereto;

a machine-learning engine for applying the machine-learning algorithm to said formatted financial transaction historical data to generate first order logic language rules that cover said formatted financial transaction historical data; and, a rule-application engine for applying the first order logic language rules to data relating to a group of new financial transactions in order to identify fraudulent financial transactions in the group of new financial transactions.

In a preferred embodiment of the sixth aspect, the computer apparatus comprises:

a rule analysis and refinement engine for analysing the first order logic language rules generated by the machine-learning algorithm to obtain a subset of said first order logic language rules such that the subset can be used as the first order logic language rules that are applied to the data relating to a group of new financial transactions in order to identify fraudulent financial transactions in the group of new financial transactions.

According to a sixth aspect of the present invention, there is provided computer apparatus for detecting data quality anomalies in a set of new data, the computer apparatus comprising:

a data formatting engine for formatting historical data to be in a form suitable for application of a machine-learning algorithm thereto;

a machine-learning engine for applying the machine-learning algorithm to said formatted historical data to generate first order logic language rules that cover the data quality anomalies found in said formatted historical data; and, a rule-application engine for applying the first order logic language rules to new data in order to identify data quality anomalies in the new data.

In a preferred embodiment of the sixth aspect, the computer apparatus comprises:

a rule creation engine that identifies data quality anomalies automatically, and is therefore able to use the same data set both as the historical data and the new data, in order that the system can be used to detect data quality anomalies in data with no prior analysis required.

BRIEF DESCRIPTION OF THE DRAWINGS

Embodiments of the present invention will now be described by way of example with reference to the accompanying drawings, in which.

DETAILED DESCRIPTION OF THE PREFERRED EMBODIMENTS

The preferred embodiments of the present invention process heterogeneous data sets comprising historical examples and background data to derive predictive rules, which, in one particular application, are subsequently applied to financial transactions in order to identify those that are likely to be fraudulent; and in another application, are applied to data in order to identify data quality anomalies therein. The preferred embodiments of a system according to the present invention comprise a number of distinct components described in detail in the following sections.

Figure 1:
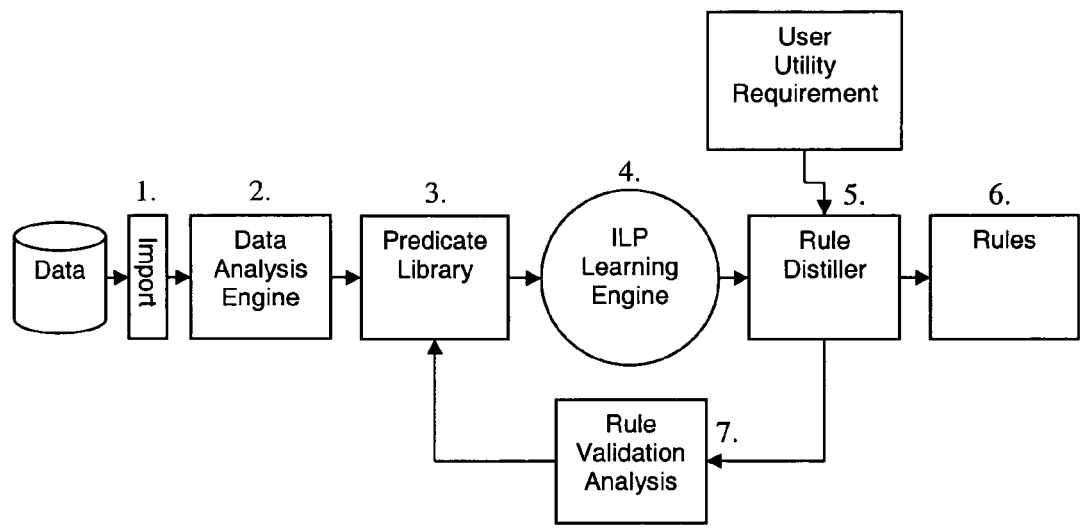
FIG. 1 shows schematically an overview of how the components of the preferred embodiment fit together.

FIG. 1 provides an overview of how the components of the preferred embodiment fit together.

1. The system's data import features allow the system to connect to any JDBC driver data source. The system is able to handle relational data found in multiple related database tables, rather than having to rely on propositional data found in single flat tables as in standard rule generation algorithms.
2. The data analysis engine analyses the data to:
   a) identify data association patterns, and
   b) identify which elements of the data are strongest candidates for constructing rules.
3. The predicate library reconstructs the input data in the form of first order logic language (e.g. Prolog, see further below) "predicates" for input into the ILP learning engine.
4. The ILP engine is a preferably pluggable component that generates rules from data, taking multiple forms:
   a) a technologically advanced evolutionary algorithm ILP implementation (for robust fast learning of accurate rules from noisy data in a batch process),
   b) a technologically advanced hypothesis tree-based ILP implementation (for incremental learning of hypotheses from a stream of data).
5. The rules produced by the ILP engine are then analysed by a new rule distillation algorithm which takes a user-defined utility matrix specifying requirements for performance, and finds the optimal subset of the rules that comply the with performance requirements.

6. The optimal subset of the rules is then output to the user, and can be automatically transformed into English (or other natural language) prose should the end user require it.
7. The rules are tested for their accuracy on separate data, and their performance is fed back into the system.

1. Background to the Technology 1.1 ILP and Prolog

Inductive logic programming (ILP) is one of the newest subfields of artificial intelligence (AI). It combines machine learning methods with the power of a first-order logic language representation. Using a process called induction, ILP systems develop rules from examples and background knowledge. The examples, background knowledge and final rules are all described in a first order logic language, in the form of logic programs, for which the programming language Prolog is currently most suitable.

1.1.1 Prolog Language and its Properties

Prolog logic programs represent a subset of first-order predicate calculus on a computer. Logic programs allow the description of complex objects and the relationships that exist between them. Relationships are represented in Prolog using "predicates". Each predicate describes a logical relationship, and uses a number of "clauses" (also known as "rules"). This representation allows the system to import data from multiple tables in a relational database, rather than merely from propositional data found in flat files.

1.1.2 ILP in Theory

Figure 2:
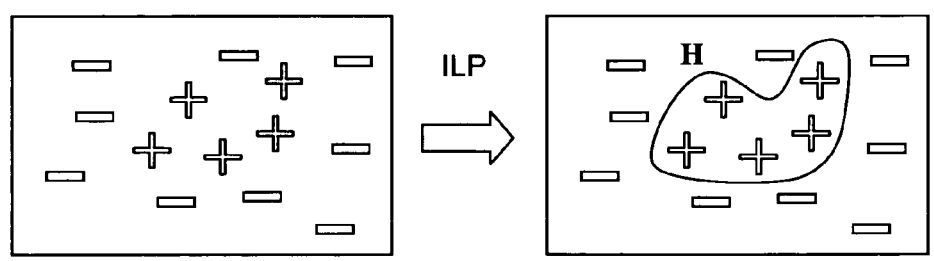
FIG. 2 shows schematically an example of the fundamental procedure undertaken by an ILP algorithm.

Referring to FIG. 2, the fundamental procedure undertaken by an ILP algorithm can be summarised in the following manner. Given the inputs:

1. background knowledge B, and
2. a set of examples E an ILP engine constructs a hypothetical set of rules H which, when combined with the background knowledge B, explains all the examples E:

$$B \cap H = E$$

The background knowledge, examples, and hypothetical rules are all handled internally by the system.

1.1.3. Relational Learning and ILP

By using first-order logic as a representation language, ILP learning algorithms can learn more expressive rules than in older, more traditional learning systems, such as decision trees. ILP algorithms learn rules that can describe structural relationships between objects in a domain and that can make full use of any prior knowledge about the domain.

Certain modules of the preferred embodiments described in the present specification are based on ILP and therefore enjoy all the advantages inherent in this choice of algorithm. Thus, in the preferred embodiments, background knowledge is used to learn accurate explanatory rules from the data; rules are expressed in easily comprehensible descriptive clauses; the system is not a "black box" engine (such as a neural net, for example), so the output can be easily verified and understood by humans; the system provides a process of "machine-aided discovery", such that traits in the data can be found by the algorithm, and then understood by the human operator 1.1.4 Standard ILP Algorithms Standard ILP implementations use an incremental covering algorithm to process the examples. In general terms, this proceeds as follows:

1. let an example set consist of positive examples P and negative examples N;
2. let the set of rules R be an empty set;
3. let S, the set of examples left to cover, be initialised equal to P;
4. if S is empty, terminate and return rule set R;
5. remove from S the first example e in S;
6. find an "optimal" rule r that explains e;
7. if no such rule can be found let r=e, and label it an exception;
8. add r to R;
9. let E be the set of all positive examples explained by r;
10. let S=S\E (set difference);
11. go to step 4.

The method used to achieve the step of finding an "optimal" rule (step 6 above) varies depending on the implementation. Discussed in more detail below is an example of a new method using evolutionary algorithms, as well as an example of a new method of undertaking ILP which does not use the traditional incremental covering algorithm approach.

1.2 Shannon's Mathematics of Information

Claude E. Shannon developed his theory of the mathematics of information when he was trying to find a mathematical means to describe the randomness of a sequence of signals transmitted via a communication channel, and the amount of information that knowing the value of a single signal would impart.

The following sections give a summary of Shannon's mathematical definitions for the various measures of information and randomness.

Shannon was considering the following situation. Signals from a known library of possible signals were transmitted down a communication channel, and each signal X had a certain probability P(X) of being input into the communication channel.

In the preferred data analysis engine discussed below, rather than considering a communication channel transmitting different signals, instead a column (or set of columns) in a data table, and the different values that appear in that column (or set of columns), are considered. Shannon's communication channel becomes a data table column, and Shannon's signals become rows in that column. The probability P(X) can be calculated for a particular value x as being the number of rows that have value x divided by the total number of rows.

1.2.1 Shannon's Information Measure

Shannon wanted to give a measure for the amount of information that was imparted by or required to encode a particular signal arriving down the data channel.

For present purposes this is equivalent to the amount of information given by the data table column taking a particular value X. This is given by the formula:

$$\text{information}(X) = -\log_2(P(X))$$

1.2.2 Entropy

In defining "entropy", Shannon created a measure for the "randomness" of the communication channel C. That is, how difficult it is to encode signals in general that are communicated down that channel. For present purposes, this is equivalent to the randomness of a particular column in a data table. It is given by the formula:

$$\text{entropy}(C) = \text{average}(\text{information}(X)),$$

where the average is over all possible values for the signal X. More formally:

$$\text{entropy}(C) = -\sum_{X \in C} P(X) \log_2(P(X))$$

1.2.3 Mutual Information

Shannon then considered multiple communication channels and described how much information about the signal on one channel was imparted by knowing the signal on another. He called this measure the mutual information of the two channels.

Another way of describing this measure is how random is the combined channel formed from viewing the two channels as one, in relation to the sum of the randomness of the two sub-channels.

For present purposes, this is equivalent to saying "How much information is given about the possible value of a row in one column, if the value of that row in another column is known?" and can be expressed as:

$$\text{mutual-information}(C1; C2) = \text{entropy}(C1) + \text{entropy}(C2) - \text{entropy}(C1; C2)$$

1.2.4 Association Strength

Other metrics used within the preferred data analysis engine, which follow as a logical extension of Shannon's mathematics, are the notions of association strength and gain ratio.

The association strength gives the mutual information of two channels as a proportion of the less random of the two. The gain ratio gives the mutual information of two channels as a proportion of the more random of the two.

It is a fact that the combined randomness of two columns is always greater than or equal to the randomness of either of the two sub-columns. Thus the association strength and gain ratio will always fall in the range 0-1, and are defined as:

$$\text{association-strength}(C1;C2) = \text{mutual-information}(C1;C2)/\min(\text{entropy}(C1),\text{entropy}(C2))$$

$$\text{gain-ratio}(C1;C2) = \text{mutual-information}(C1;C2)/\max(\text{entropy}(C1),\text{entropy}(C2))$$

1.3 Evolutionary Algorithms

Evolutionary algorithms refer to a broad paradigm that covers stochastic population-based search and optimisation based on neo-Darwinian ideas of natural selection and survival of the fittest. Two of the most popular evolutionary algorithms are genetic algorithms (GA) and genetic programming (GP). This form of optimisation does not assume any prior knowledge about the domain search space.

Typically a population of proposed solutions to a particular problem is initially randomly generated. Solutions are then evaluated and assigned a fitness which is derived from a cost function. In order to proceed to the next generation of individuals, parents are selected based on fitness. Recombination (or crossover) operators are then applied to each parent pair in order to produce a new individual or offspring. Mutations are further applied to allow the search process to be less susceptible to being stuck in areas that might be locally optimal but are not so optimal from a global perspective.

The main difference between GA and GP lies in the representation language. GA typically uses binary or real-valued encoded fixed length representations or chromosomes. GP uses computer programs similar to decision trees instead, thus allowing it to have variable length and depth in representation terms.

These algorithms are seen as very useful search and optimisation algorithms for difficult combinatorial problems that are too difficult to be solved using more deterministic approaches that rely on pre-specified search paths or assume certain characteristics about the search domain a priori.

2. Specific Innovative Technologies Introduced in this Specification

2.1 System for Finding Association Patterns and Irregularities in Data

As part of the overall system design, a new data analysis engine is used in the preferred embodiment to analyse input data. The preferred data analysis engine builds an associative tree hierarchy over the fields (or columns) in the data using techniques that are analogous to Shannon's mathematical information theory. By joining columns that are most closely associated, the tree can produce a compressive representation (i.e. a representation that effects compression) from which the original data can be reconstructed, while at the same time indicating relationships in the data through a specialised information-theoretical analysis.

2.1.1 Data Analysis Engine Data Structure

Underlying the preferred data analysis engine is a binary tree structure, called a data field association tree or "D-fat" for short.

A D-fat is an unbalanced binary tree, with a leaf node for each column within the original data table. Each leaf node represents a distinct column within the original data table.

Figure 3:
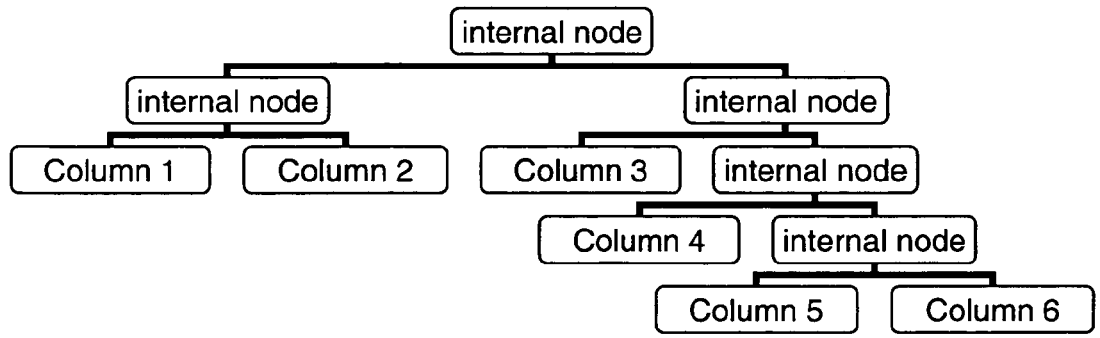
FIG. 3 shows schematically an example of a data field association tree (D-fat)

Referring to FIG. 3, each non-leaf node is formed by combining two sub-nodes together. Each non-leaf node therefore represents a number of columns from the original data table, with some of the columns coming from its left child, and the rest from its right child.

An unpopulated D-fat topology is a D-fat that represents a hierarchical view of the columns within a data table, with no data contained within it.

Once an unpopulated D-fat topology has been constructed, it can be populated with data from any source that has the same layout as the original data source (including the original data source itself). The data analysis engine provides the user with the ability to populate D-fats from a variety of data sources.

Figure 4:
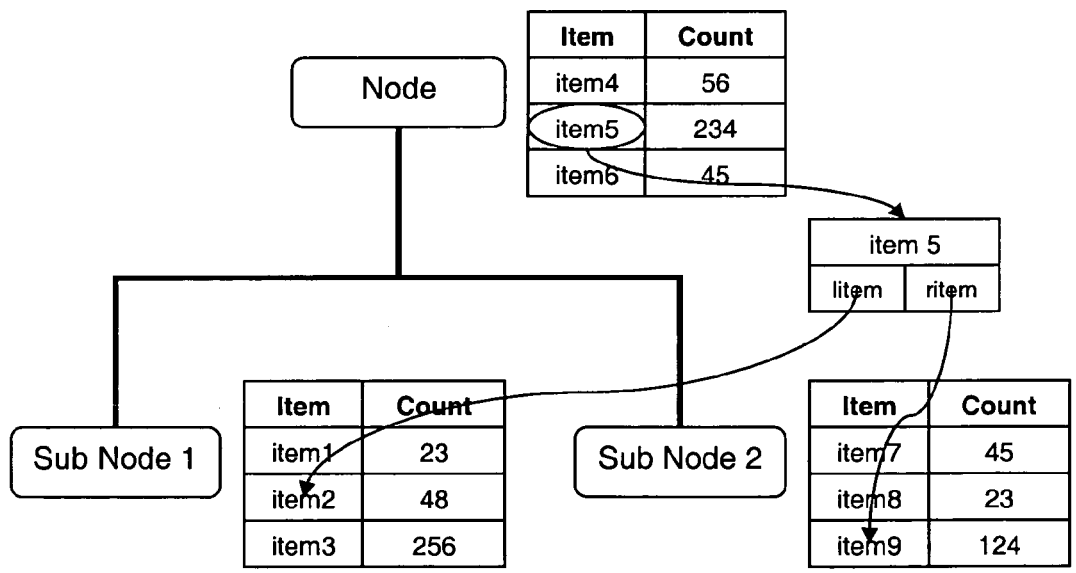
FIG. 4 shows schematically an example of a populated D-fat.

Referring to FIG. 4, a populated D-fat is a D-fat topology that has been populated with the data from the data table. In a populated D-fat, each node stores a list of items, and each item is associated with a count of the number of times that item appears in the data table. An item represents a single unique row in the data table restricted to the columns represented by that node.

In a leaf node, each leaf item consists of a single value that appears in the column associated with that leaf-node.

In a non-leaf node, each non-leaf item consists of two pointers. One pointer points to an item in the left child sub-node and the other points to an item in the right child sub-node.

The cardinality of a node is the number of distinct items it contains. The sample size of a node is the sum of the counts for all the items it contains.

2.1.2 Tree-Construction Algorithm

The preferred data analysis engine is able to construct an unpopulated D-fat topology automatically from any data source. The algorithm proceeds generally as follows:

1. build a set of nodes N, containing one leaf node for each of the columns in the data table;
2. using an appropriate selection criterion, choose a pair of nodes n1 and n2 from N to merge, and remove them from N;
3. form a new node with n1 and n2 as its two child sub-nodes, and insert it into N;
4. repeat from step 2 above, until there is only one node left in N.

The algorithm uses an "appropriate selection criterion" at step 2. This selection criterion can be user-defined. Two main approaches are possible, namely:

1. simple tree building: a fitness measure is defined for each node, and the algorithm merges the two best nodes; and,
2. duplex tree building: a fitness measure is defined for each pair of nodes, and the algorithm chooses the best pair.

The system allows the user to select the method used to build the D-fat. The default methodology is to use the duplex tree building method and to use a fitness measure that chooses the pair of nodes that have the strongest gain ratio. This builds the tree so that the columns that are the strongest "predictors" of each other's values are most likely to be paired together.

2.1.3 Tree-Restructuring Algorithm

Once a D-fat has been constructed, the preferred data analysis engine is able to restructure the topology of the D-fat to obtain the optimal structure according to a user-defined measure of suitability.

The preferred tree-restructuring algorithm uses a method called grandchild promotion. Each node in the D-fat can have up to four grandchildren. Promoting a grandchild node consists of:

1. pairing the grandchild's sibling node with its uncle node to form a new node X;
2. replacing the grandchild's parent node with the grandchild;
3. replacing the grandchild's uncle with the new paired node X.

Figure 5:
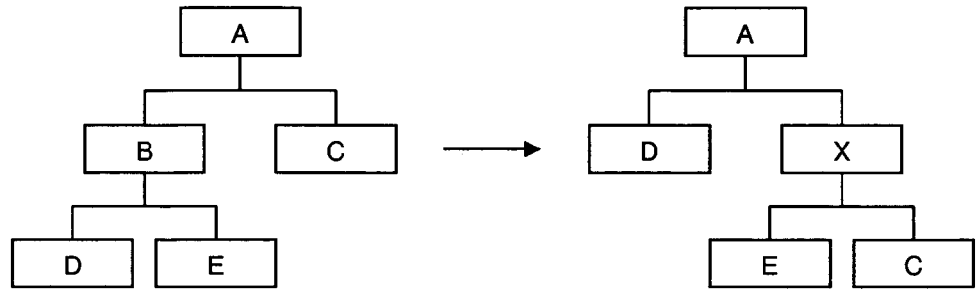
FIG. 5 shows four variations of tree rearrangement that can be enacted on a D-fat.
Figure 5:
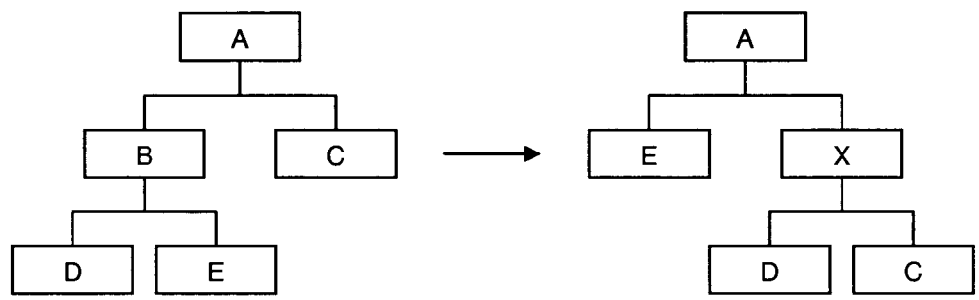
Figure 5:
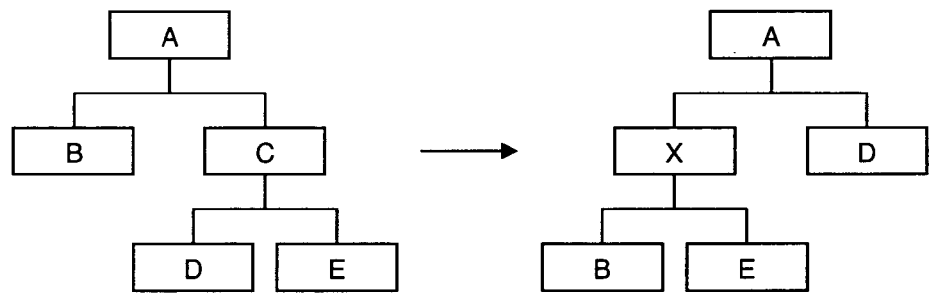
Figure 5:
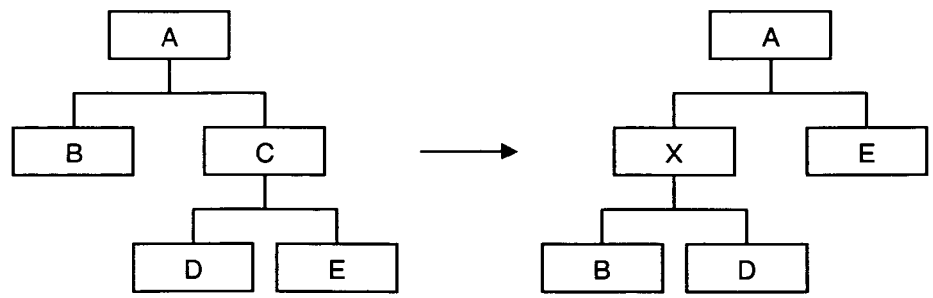

Referring to FIG. 5, there are four kinds of grandchild promotion that can take place, each relating to promoting one of the four grandchildren of a particular D-fat node.

There will now be described an example of a D-fat restructuring algorithm, which is used in the tree building algorithm to construct an optimally ordered tree:

1. conduct a depth-first search of the D-fat, considering all grandchildren of each node of the D-fat for promotion;
2. if, according to an appropriate scoring method, promoting a grandchild improves the overall score of the D-fat, promote that grandchild;
3. if a grandchild has been promoted, check to see whether promoting it yet again further improves the score of the D-fat, and repeat, promoting it until such a promotion does not improve the score of the D-fat, or until the top of the D-fat is reached;
4. continue the depth-first search of the D-fat from the node that became the final grandparent of the promoted grandchild;
5. terminate the process when the search finishes without promoting a node.

The "appropriate scoring method" used can consist of, but is not limited to, gain ratio, association, entropy, and cardinality, computed as a sum across all of the nodes in the D-fat.

Once the tree restructuring process is complete, the optimal tree is obtained in respect of the scoring method chosen.

In an alternative embodiment, the tree-restructuring algorithm can be applied after each iteration of the tree-construction algorithm (as a step before step 4 in the description of the tree-construction algorithm given in the previous section).

2.1.4 Tree Difference Analysis

Once a pair of D-fats has been populated, the data analysis engine is able to compare the Shannon metrics for those two trees, and to alert the user if there are any fundamental differences between them (beyond for example an optional user-defined tolerance level).

Figure 6:
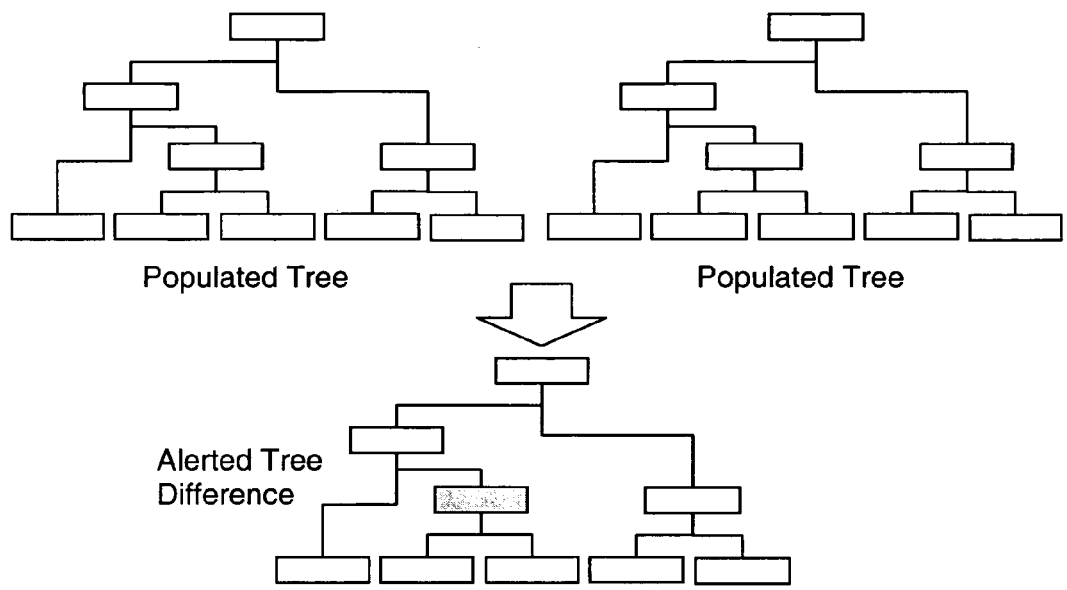
FIG. 6 shows schematically the comparison between a pair of populated D-fats to allow a user to be alerted to any fundamental differences between the D-fats.

This difference detection alerts the user if there is a fundamental movement in the underlying pattern found in the data. For instance, the data may be a sequence of measurements being produced from a monitoring station. Referring to FIG. 6, any large change seen in the underlying relationships in the data is alerted to the user.

This process operates in a recursive manner. The following describes the algorithm used to compare two populated D-fats, T1 and T2:

1. let the queue Q1 contain only the top node n1 of T1 and let the queue Q2 contain only the top node n2 of T2;
2. if the queues Q1 and Q2 are both empty, then terminate;
3. if either of the two queues is empty while the other is not, report a structural difference and terminate;
4. take the element n1 from queue Q1 and the element n2 from queue Q2;
5. if one of n1, n2 is a leaf node, while the other is not, report a structural difference, and go to 2.
6. compare Shannon metrics for n1 and n2, and report y difference that exceed the given thresholds;
7. if n1 and n2 are both non-leaf nodes, insert the children of n1 at the end of Q1 and the children of n2 at the end of Q2;
8. go to 2.

2.2 Using the Data Analysis Engine

The D-fat structure can be used to analyse the data fed to the ILP engine in the following ways:

2.2.1 Column Relevance

The data analysis engine can find the columns that are most closely related to a classification column (true or false, fraud or genuine, etc). These columns are more likely to provide strong predictive power, and should therefore be the preferred columns used in the construction of rules.

Figure 7:
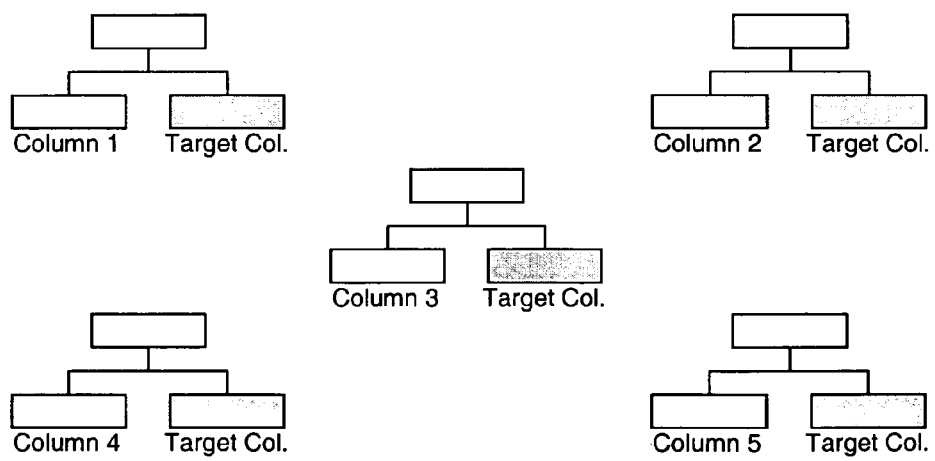
FIGS. 7 to 9 show schematically examples of three main approaches for identifying the columns of a D-fat that are most closely related to a classification column.
Figure 8:
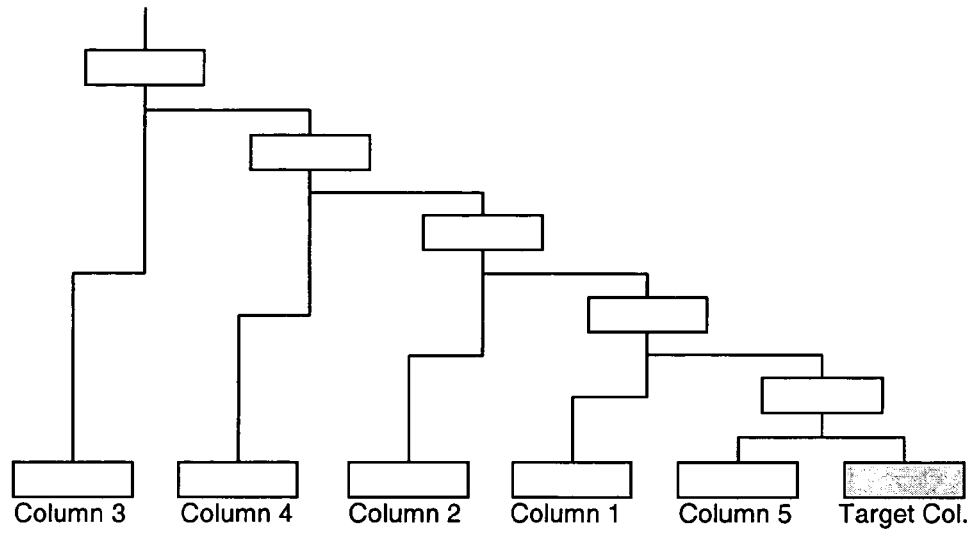
Figure 9:
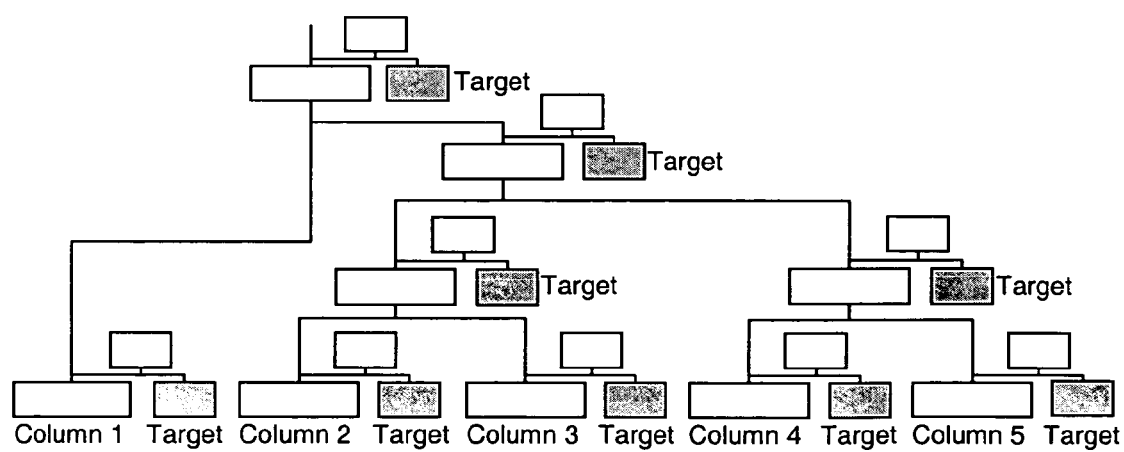

There are three main approaches that undertake to identify the top n most predictive columns suitable for use in predicting the class of the classification column:

1. Referring to FIG. 7, to individually pair each of the candidate columns with the classification column into 1 level D-fats. Pick the n columns with the strongest association.
2. Referring to FIG. 8, starting a tree consisting of a leaf node representing the classification column, iteratively join the top of that tree to the most closely associated unpaired candidate column, until no such columns remain. Choose the first n columns joined to the classification column sub-tree.
3. Referring to FIG. 9, build a D-fat in the standard manner from all the columns excluding the classification column, and then form sub-trees by joining classification column to all the internal nodes of that D-fat. Keep the n columns that appear in the sub-trees with the strongest association.

Each of these methods has its own purpose:

1. If the user is learning from simple propositional data to learn propositional rules, the first methodology is most appropriate.
2. If the user wishes to establish which set of columns should be used for learning, the second method is most appropriate.
3. If the user wishes to establish which combinations of columns should be used for learning, the third method is most appropriate.

2.2.2 Data Stream Differences

If two streams of data with the same format need to be compared, then two D-fats can be populated from each of the data streams. The tree difference analyser can then be used to identify the differences between them, and the ILP engine can be fed these differences as examples. The ILP engine then builds rules to describe (or summarise) the differences between the two streams of data.

2.2.3 Data Anomalies

By comparing a sequence of data with an earlier sequence of data from the same data source, the system can identify where errors are present in the data, rather than merely variations within the normal expected pattern of behaviour of the data. The user is alerted with an identification of where in the data analysis engine data structure the aberration has been detected and the degree of variation from the norm. A user-defined threshold can be used to ignore all such variations below a certain threshold. If the threshold is exceeded, the user is alerted to the problem and can therefore take steps to remedy the data anomaly. Through knowing the degree of aberration, and its location, the user can make a more informed choice of remedial action

2.3 Undertaking ILP Using Evolutionary Algorithms

For any ILP algorithm, the search space of logic programs is typically a very large and difficult one for any optimisation technique. Many ILP techniques employ directed tree-based search for optimisation of the hypothesis set. Some attempts have been made in the past to replace the innermost part of this search with GA without changing the global ILP architecture.

The preferred embodiments described herein employ a new variant of ILP that is based on evolutionary algorithms by making the evolutionary process a core part of the entire ILP algorithm. A new variant of evolutionary algorithm is used here to evolve logic programs explicitly using the basic ideas of selection, recombination and mutation.

The new genetic representation of logic programs is such that all the evolutionary operators result in efficient navigation of the hypothesis space without having any offspring produced that are illegal from the point of view of a logic program. If illegally constructed offspring are not properly avoided, an evolutionary ILP would be too slow and thus expensive in terms of evaluation costs and would not have adequate predictive accuracy.

2.3.1 Preferred Current Approach

The standard ILP approach uses a deterministic tree search for exploring the search space. This works well when the data set is highly regular: by examining a single attribute (or very few attributes) of a data example, descriptive patterns of the entire data set can be generated, and therefore only a few rules are required. As described above, standard ILP algorithms use an incremental cover set algorithm: they look in turn at each example that has not yet been covered by a rule and try to generalise it. When a rule is found, all examples are evaluated against this rule, and examples that are explained by the new rule are marked as "covered".

Looking at each unexplained example in the data set in turn leads to a beneficial side effect when the data set itself is highly regular. Noisy examples (which are harder to explain) are more likely to be the "left over examples", which can be investigated only during the later stages of the search process. Thus the search can be terminated early, and the examples that remain can be treated as outliers or exceptions.

A number of drawbacks of the old approach are addressed by this aspect of the preferred embodiments.

For example, the assumption that data is highly regular and that a very few examples are representative for the entire data set is not valid in most problem domains. Many real world domains where techniques for data mining are employed suffer from problems with the validity of data, missing information, and data that do not represent common patterns. Irregular data sets which suffer from these problems are referred to as noisy, since much information in the data set can deceive learning algorithms and cause a flawed end result. When an ILP algorithm is attempting to generalise an example that is not representative of the data set, valuable processing time is wasted which also makes the order of data examples a crucial factor in the search process. Thus much time can be wasted when looking at noisy data sets.

To retain the power of explaining patterns of data in a Prolog format, and also make the search more robust, the preferred embodiment uses a new evolutionary search process that searches the data set on a global level and can concentrate on true features in the data. In order to retain the most useful features of the standard ILP process, and thereby deliver the full explanatory power of ILP, this method employs a special version of Progol's bottom clause generator. Given a single example, Progol's bottom clause generator creates the most complex and specific rule (clause) that explains that example. This rule is known as the bottom clause, and it completely defines the entire search space of possible rules to explain the given example. The new version of this component described herein generates the bottom clause for multiple examples at once. By using a large sample of the dataset to generate it, this bottom clause defines a search space that entails a large part of or the entire data set and explicitly defines the search space for rules that could explain many, if not all, of the examples at once. This approach mitigates the effect of noisy or irregular data on the search process.

Two examples of such technologies, which use a genetic algorithm coupled with the new bottom clause generator to undertake inductive logic programming, will now be described.

2.3.2 Method 1: Sequentially Using a Subset of Examples to Generate a Bottom Clause In this new approach to ILP, a sequential search is conducted with one population in the genetic algorithm using a bottom clause that is generated using a large sample of the examples in the data. The genetic algorithm's population's sole purpose is to find the optimal hypothesis for the examples entailed by that specific multi-example bottom clause. As before, when an acceptable rule has been found, the examples covered by that rule are retracted from the data set. A sample is then taken from the reduced set of examples not yet covered by a rule and a new bottom clause entailing many examples is generated.

One of the problems with standard sequential ILP approaches is that the results are highly dependent on example order and that time is therefore potentially wasted evaluating noisy outlier examples which do not represent general features in the data set. By randomly sampling a sufficiently large subset of data points and generating a bottom clause from them, the likelihood is high that examples that can generate good rules have been used.

Since the search is sequential, an implicit bias will be introduced to cover examples during the later stages of evolution that do not conform to the more general patterns in the data set. Since many examples define the search space, the situation in which time is wasted trying to generalise noisy examples is less likely to occur. Even on irregular data, the remaining examples can be treated as noise.

2.3.3 Method 2: Concurrent Evolution of Entire Rule Set Using an Island Approach This method first generates a bottom clause from the entire data set, this bottom clause therefore defining the entire search space. As this can be computationally expensive, this method may be more suitable for smaller data sets, but leads to the most accurate results.

1. Syntactically correct subsets of the unified bottom clause are used as genotypes of the population.
2. The population itself is divided into subparts, known as islands, where refinement and search is conducted only between genotypes on the same island.
3. The refinement operators, crossover and mutation, are used to copy material between genotypes and alter them respectively. Since no communication occurs between the islands, most islands will evolve their own idiosyncratic rule which is optimised over time.
4. Additionally, a meta-genetic algorithm can, with low probability, either a) duplicate a strongly performing island into a new island or b) remove a poorly performing island completely.
5. Steps 3 and 4 are repeated until the genetic algorithm has converged.
6. The end result will be-a rule set for the data set which is evolved concurrently.

An idiosyncratic rule within a collection of rules is defined to be a rule that covers (explains) examples that are covered by no other rule within the collection. The more unique the set of examples explained by a rule, the more idiosyncratic that rule is said to be.

This approach induces an implicit bias in the search since there will be a tendency for rules to cover examples that are more easily covered. There is therefore no guarantee that the rules will remain idiosyncratic. In order to compensate for this effect, the worst performing rules that overlap to a higher degree with other rules will be penalised and their corresponding populations will be mutated more heavily.

2.4 Undertaking ILP in an Incremental Manner by Deriving a Tree Structure Representing Potential Rules As described in the background section, standard ILP implementations use an incremental cover set algorithm method to progressively explain the positive examples until all examples have either been explained by a rule or are classified as an exception.

A new and technologically superior approach is described here which adopts a different strategy, by incrementally constructing a data structure from examples from which the hypotheses can be extracted, rather than by trying to derive a rule from each unexplained example in turn.

2.4.1 Description of the Preferred New Approach

In this new approach to ILP, hypotheses are built using a stochastic logic program consisting of a set of refinement operators. Each example presented to the system is successively refined by application of the refinement operators until an hypothesis that explains the given example is obtained. At each refinement step a number of different choices of refinement operator will be available. The branching induced by these choices lead to a number of different refinement paths with different hypotheses at the end of each path.

There will potentially be very many choices of refinement operator at each stage. Accordingly, in order to reduce the number of paths taken, a sample of the refinement operators will be chosen according to the posterior distribution of the stochastic logic program (see below).

This algorithm uses a tree structure to store these refinement paths, with hypotheses at the leaves of the tree. The nodes of the tree represent each point at which a choice of refinement operator exists and the branches from each node represent the alternative choices.

The structure stores at each node of the tree information which is updated to represent a posterior distribution over the potential refinement choices at each stage. This distribution reflects an estimation of the likelihood that taking that refinement path will be "successful", i.e. lead to a compressive hypothesis, and how "good" that hypothesis is, in terms of its compression.

Therefore the structure records both the number of times taking a refinement path has been successful and the number of times it has been unsuccessful. Additionally, two bitsets at each leaf store a record of the positive and negative examples that have been covered by the hypothesis at that leaf.

Updating the tree is an incremental process, with examples added to the tree one by one. As the posterior distribution of the stochastic logic program is updated, so the refinement samples for each new example will be chosen to reflect it. The tree is also pruned in order to remove unsuitable branches when the statistics indicate that no suitable hypothesis can be found from that branch.

The tree is stored in a compact representation in which standard sequences of refinement that are always taken will be represented by a single node rather than by a sequence of nodes. In other words, any node with only one child is merged with that child.

Once all examples have been added to the tree, the optimal subset of the hypothesis leaves is chosen using the preferred hypothesis distillation algorithm described below (see section 2.5 "Extracting a Specialised Subset of the Rules Based on User-Defined Performance Characteristics" below).

2.4.2 Formal Description of the Algorithm

The tree structure used in this algorithm consists of a set of nodes, with each node storing references to the sub-nodes (children), and certain statistical measures necessary to the construction algorithm itself.

All nodes store:
the number of visits from both positive and negative examples, separately.

Non-leaf nodes additionally store:
the number of visits from examples that have led to a hypothesis being generated, through a successful resolution proof, for each of positive and negative examples, and
a map from refinement operator to child nodes (taking a particular refinement step will always lead to the same resulting child).

Leaf nodes additionally store:
a pair of bitsets which index which of the positive and negative examples have been covered by the hypothesis at that leaf node.

The algorithm itself is described below:
Let tree=an empty non-leaf node
Main Loop
1. Receive example <e,class>
2. Let Goals=[e]
3. (v,s)=Prove(Goals,tree,class)
4. tree.visits(class)+=v; tree.successes(class)+=s;
5. goto 1

Prove(Gs,n,class)
1. if Gs=[ ] {set Bitset[class](example); n.v+=1; n.s+=1; return (1,1);}
2. int v=0; int s=0;
3. Let R={r1, r2, . . . rm}=sampleRho(m,n); Let Goal=head(Gs)
4. for each r in R {(v',s')=Refine(n,r,Goal,class); n.v+=v'; n.s+=s'; v+=v'; s+=s'; }
5. return (v,s)

Refine (n,r,[Goal|Goals],class)
1. Let newn=GetChild(n,r,Goal)
2. if (G doesn't unify with head(r)) {(v,s)=(1,0); newn.v(class)+=1}
3. else {unify G with head(r); append(goals(r),Goals,NewGoals); (v,s)=Prove(NewGoals,newn,class)}
4. return (v,s)

GetChild(n,rho,Gs)
1. result=n.children.get(rho)
2. if (result==null)
3. {if (Gs==[ ]) n.children.put(rho,result=new Leaf Node)
4. else n.children.put(rho,result=new Non-Leaf Node)}
5. return result 2.5 Extracting a Specialised Subset of the Rules Based on User-Defined Performance Characteristics Once an ILP algorithm has been used to construct a set of rules, it is in some cases desirable to select a subset of those rules with reference to certain user-defined desired operating characteristics, which can be given in a utility matrix. This process is referred to herein as rule distillation.

In the utility matrix below, P stands for "predicted" (the prediction made by the rules) and A for "actual" (the actual real classification of the item).

|  | $P$ | $\sim P$ |
|---|---|---|
| $A$ | $a$ | $b$ |
| $\sim A$ | $c$ | $d$ |

Each term in the utility matrix is a weighted score for an example that is covered/not covered in the correct/incorrect manner by a set of rules. It is assumed that it is normalised such that a+d=1.

The score of a rule-set R can be defined in terms of the number of examples it covers (shown in the following contingency table) and the size n of the rules in the set (in terms of the number of literals in those rules).

|  | $P$ | $\sim P$ |
|---|---|---|
| $A$ | $w$ | $x$ |
| $\sim A$ | $y$ | $z$ |

$$score(R) = (aw + bx + cy + dz)$$

The algorithm proceeds as follows:
1. given a rule-set R={R(1), R(2), . . . R(n)}, and prune-set T, an ordered set of positive and negative examples;
2. evaluate the coverage over the positive and negative examples in the prune-set for each rule, and store them in bitsets BP(i) and BN(i) for each rule R(i) (with the bit set if the respective example is covered);
3. let C={}, the set of chosen rules;
4. compute the score S(i) (as above) for each rule R(i) using its respective bitsets BP(i) and BN(i);
5. terminate if no rule scores better than the last rule that was added to C.;
6. add (R(j),S(j)) to C where j is the index of the best scoring rule;
7. remove R(j) from R;
8. let BP(i) =BP(i) U BP(j) and BN(i)=BN(i) U BN(j) for all i left in R;
9. repeat from step 4

2.6 Distribution of ILP Process over Several Processes

Figure 10:
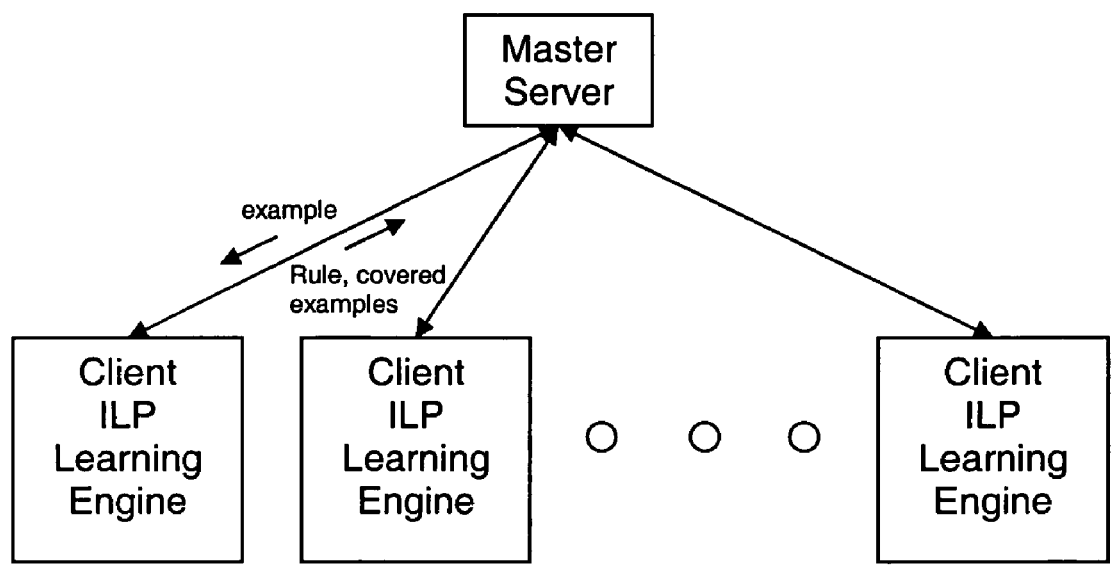
FIG. 10 shows schematically an example of the distribution of an ILP process over several processes.

Normally the learning algorithm is run in one process and systematically goes through the examples until all are covered (see the background section above). In order to improve the speed of the algorithm, this process can be spread across multiple processes. Referring to FIG. 10, this is achieved by each process performing a generalisation of a single example in parallel. It should be noted that the several processes may be run on the same processor or on more than one processor.

Each of the processes runs a rule generalisation engine. Each engine has full accesses to all the background knowledge for the learning task. A controller process stores a list of all the currently uncovered positive examples.

The controller passes each engine an example to generalise. Once an engine has finished its generalisation, it reports the rule it found and the examples covered by this rule back to the controller.

The controller then retracts these examples from its list of uncovered positive examples and stores the rule. It then selects another example that has not been covered to send to the waiting engine.

This process is repeated until all examples have been processed and/or covered.

Using a controller allows early terminations parameters to be set for a given learning task. There are two methods:
1. termination of the learning task once a given percentage of the positive examples have been either covered by a rule or have been processed and no suitable rule could be found for them, and
2. termination of the task when a limit is exceeded on the number of consecutive examples for which no rule can be found. This means that if given N generalisations a rule has not been found, the learning will terminate.

2.7 Applications of These Technologies

This section describes the processes of the application of the preferred embodiments discussed herein.

Figure 11:
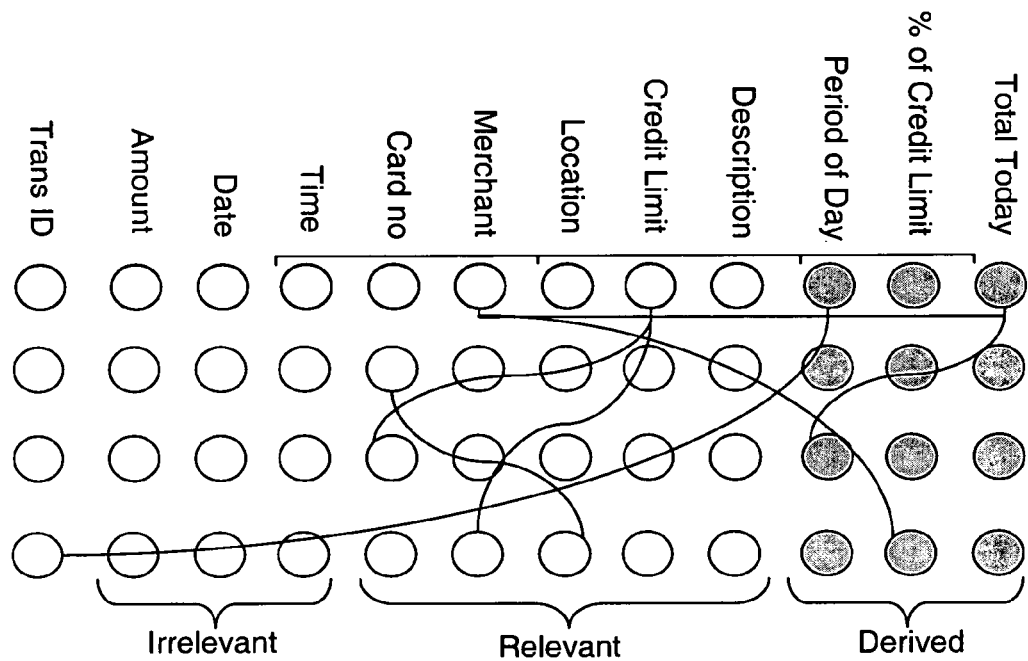
FIG. 11 shows schematically an example of the application of the preferred embodiment to data.

The process of applying the preferred embodiments discussed herein to data is shown schematically in FIG. 11. This diagram does not exclusively indicate the data that can be handled by this technology, but is intended merely to illustrate generally the types of data that might typically be analysed. Each row in the diagram relates to a row of data in the original data being analysed. The original attributes of the data are shown as white circles. Additional, derived attributes are shown shaded in grey. These are attributes that are added to the data to provide the ILP algorithm with a more appropriate set of attributes than the raw data can provide.

Conversely, some of the original data attributes may not be relevant to the predictive tasks at hand. These attributes are therefore excluded from the analysis. There are therefore left the relevant and derived attributes of the data.

It is useful to define further "relational" predicates that describe relationships between the rows of data, so that the ILP algorithm can use them in the construction of its rules. Examples of these types of predicates are: "transaction X and transaction Y took place in a different country". "transaction X took place earlier than transaction Y"; "an earlier transaction than X took place in Germany". These types of predicates are illustrated on the above diagram using curved lines.

2.7.1 Standard Development: Using Domain Expertise

In the standard process model in accordance with one embodiment of the present invention, consultants work closely with (human) domain experts in order to derive a suitable set of relevant and derived data attributes.

Figure 12:
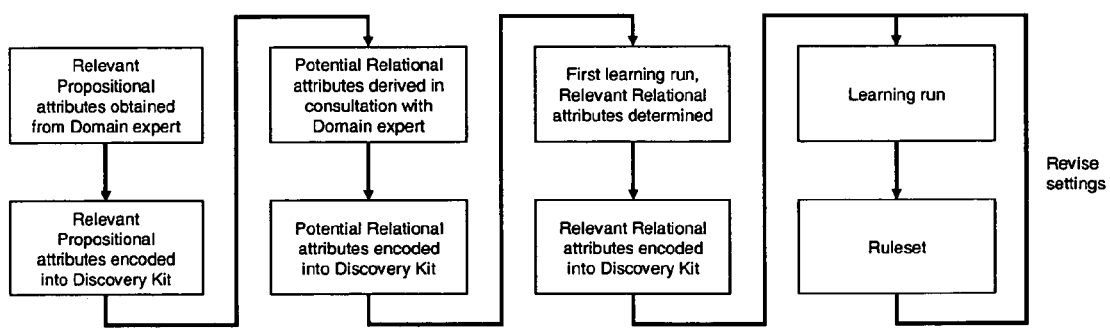
FIG. 12 shows schematically an example of how domain experts derive a suitable set of relevant and derived data attributes; and, FIG. 13 shows schematically an example of how iterations of learning runs can be used to determine the relevant data attributes and relational predicates in the absence of domain experts.

Referring to FIG. 12, usually a domain expert will know which attributes are strong classifiers for their target concept. If required, derived attributes are pre-computed and appropriate corresponding predicates are added to the system.

A domain expert will also generally have a fair idea which relational attributes may be useful in determining classification. A full set of these relational attributes are derived in consultation with the domain expert, and encoded in to the system. This means that the system will potentially contain irrelevant relational attributes.

The objective of the first learning run is then to eliminate these irrelevant relational attributes, thereby improving the speed and accuracy of further learning runs.

The final runs use the refined relational system, and are repeated until an optimised set of learning engine settings is found.

2.7.2 Extended Development: without Domain Expertise

Figure 13:
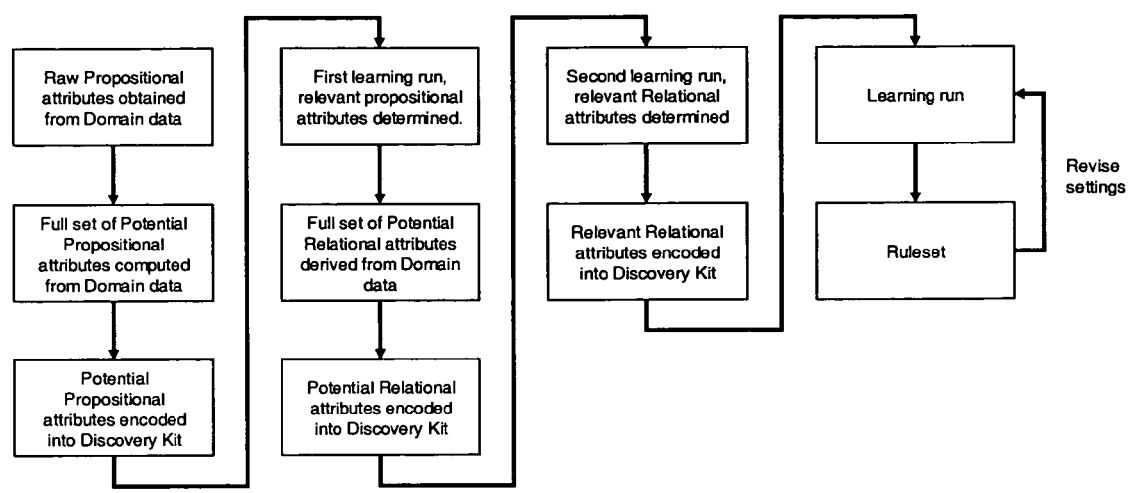

Referring to FIG. 13, in the absence of readily available (human) domain expertise, in accordance with an embodiment of the present invention a more lengthy iterative approach can be adopted in order to derive a suitable rule set.

Iterations of learning runs are required to determine the relevant data attributes and relational predicates. By virtue of the fact that these runs must include all possible (propositional or relational) attributes, they will by necessity require a much longer run-time to complete.

The final run will only include those propositional and relational attributes that have been deemed relevant. It will therefore run in a relatively shorter time period, or the search can be made more exhaustive to obtain a more accurate rule set in the same time period.

2.7.3 Application to Financial Fraud

In an embodiment of this invention, the technology is applied to detecting fraudulent financial transactions in a group of new transactions.

The following is an example of the sort of rule produced by the system by applying the preferred ILP algorithms discussed herein:

fraudulent(A):—
ecomm_no_additional_info_cd(A,('0')),
fraud_score_no(A, B),
card_nage(A, C),
greaterthan(B, (363)),
lessthan(C, (36)).

This rule can be interpreted as follows:

A transaction (A) is fraudulent if: the "ecomm_no_additional_info" code is set to '0', the fraud score is greater than 363, and the age of the card is less than 36 days.

Such a rule will be applied to new financial transactions in order to predict if they are fraudulent transactions.

2.7.4 Application to Data Quality

In an embodiment of this invention, the technology is applied to detecting data quality anomalies in a set of new data.

For example, the preferred ILP algorithms discussed herein can produce rules to detect inconsistencies in the data:

inconsistent(A):—
gender(A, "male"),
relationship(A, "wife").

This rule can be interpreted as follows:

A data item (A) is inconsistent if: the gender field value is set to "male", and the relationship field value is set to "wife".

Such a rule will be applied to new data in order to detect inconsistent data anomalies of that type.

It will be understood that the term "computer" as used herein is to be construed broadly. The term "a computer" may include several distributed discrete computing devices or components thereof. Although the embodiments of the present invention described with reference to the drawings comprise computer processes performed in computer apparatus and computer apparatus itself, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier be any entity or device capable of carrying the program. For example, the carrier may comprise a storage medium, such as a ROM, for example a CD ROM or a semiconductor ROM, or a magnetic recording medium, for example a floppy disk or hard disk. Further, the carrier may be a transmissible carrier such as an electrical or optical signal which may be conveyed via electrical or optical cable or by radio or other means. When the program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes. Many of the processing steps may be carried out using software, dedicated hardware (such as ASICs), or a combination.

Embodiments of the present invention have been described with particular reference to the examples illustrated. However, it will be appreciated that variations and modifications may be made to the examples described within the scope of the present invention.

The invention claimed is:

1. A method of deriving first order logic language rules for use in analyzing new data to identify anomalies in the new data, the method comprising:

formatting, via at least one processor of a computer, historical data to be in a form suitable for application of a machine-learning algorithm thereto;

applying, via the at least one processor of the computer, the machine-learning algorithm to said formatted historical data to generate a set of first order logic language rules that cover said formatted historical data;

wherein the machine-learning algorithm includes inductive logic programming and comprises, for each example in turn:

(1) successively refining, via the at least one processor of the computer, the example by the application of refinement operators to obtain one or more first order logic language rules, wherein at each refinement step a sample of refinement operators are chosen according to a probability distribution, and (2) storing the refinement steps in a hypothesis tree data structure with refinement choices and probabilities at each node, and first order logic language rules at each leaf node, the hypothesis tree and probability distribution being updated and refined for each successive example in turn; and, analyzing, via the at least one processor of the computer, said set of first order logic language rules to obtain a subset of said set of first order logic language rules which is usable as first order logic language rules in analyzing new data.

2. A method according to claim 1, wherein the machine-learning algorithm is arranged so as to learn from relational attributes in the historical data.

3. A method according to claim 1, wherein the machine learning algorithm includes an evolutionary algorithm.

4. A method according to claim 3, wherein the evolutionary algorithm includes at least one of genetic programming and a genetic algorithm.

5. A method according to claim 3, wherein the evolutionary algorithm uses a bottom clause that is generated from a subset of the historical data, said subset including plural examples from the historical data.

6. A method according to claim 3, wherein the evolutionary algorithm uses a bottom clause that is generated from all examples from the historical data.

7. A method according to claim 1, wherein the formatting of the historical data forms a data field association tree (D-fat).

8. A method according to claim 7, wherein the D-fat is constructed and restructured according to at least one user-defined criterion.

9. A method according to claim 8, wherein the D-fat is first constructed and then restructured until the user-defined criterion is achieved.

10. A method according to claim 7, comprising forming two D-fats, and comparing metrics for the two D-fats.

11. A computer storage medium tangibly storing a instructions for causing a computer having at least one processor to carry out a method of deriving first order logic language rules for use in analysing new data to identify anomalies in the new data, the method comprising:

formatting historical data to be in a form suitable for application of a machine-learning algorithm thereto;

applying the machine-learning algorithm to said formatted historical data to generate a set of first order logic language rules that cover said formatted historical data;

wherein the machine-learning algorithm includes inductive logic programming and comprises, for each example in turn:

(1) successively refining the example by the application of refinement operators to obtain one or more first order logic language rules, wherein at each refinement step a sample of refinement operators are chosen according to a probability distribution, and (2) storing the refinement steps in a hypothesis tree structure with refinement choices and probabilities at each node, and first order logic language rules at each leaf node, the hypothesis tree and probabilities being updated and refined for each successive example in turn; and, analyzing said set of first order logic language rules to obtain a subset of said set of first order logic language rules which is usable as first order logic language rules in analyzing new data.

12. Computer apparatus for deriving first order logic language rules for use in analyzing new data to identify anomalies in the new data, the computer apparatus comprising:

a data formatting engine for formatting historical data to be in a form suitable for application of a machine-learning algorithm thereto;

a machine-learning engine for applying the machine-learning algorithm to said formatted historical data to generate a set of first order logic language rules that cover said formatted historical data;

wherein the machine-learning algorithm includes inductive logic programming and comprises, for each example in turn:

(1) successively refining the example by the application of refinement operators to obtain one or more first order logic language rules, wherein at each refinement step a sample of refinement operators are chosen according to a probability distribution, and (2) storing the refinement steps in a hypothesis tree structure with refinement choices and probabilities at each node, and first order logic language rules at each leaf node, the hypothesis tree and probabilities being updated and refined for each successive example in turn; and, a rule analysis and refinement engine for analyzing said set of first order logic language rules to obtain a subset of said set of first order logic language rules which is usable as first order logic language rules in analyzing new data.

13. Computer apparatus according to claim 12, wherein the machine-learning algorithm is arranged so as to learn from relational attributes in the historical data.

14. Computer apparatus according to claim 12, wherein the machine learning algorithm includes an evolutionary algorithm.

15. Computer apparatus according to claim 14, wherein the evolutionary algorithm includes at least one of genetic programming and a genetic algorithm.

16. Computer apparatus according to claim 14, wherein the evolutionary algorithm is arranged to use a bottom clause that is generated from a subset of the historical data, said subset including plural examples from the historical data.

17. Computer apparatus according to claim 14, wherein the evolutionary algorithm is arranged to use a bottom clause that is generated from all examples from the historical data.

18. Computer apparatus according to claim 12, wherein the data formatting engine is arranged to form a data field association tree (D-fat) from the historical data.

19. Computer apparatus according to claim 18, wherein the data formatting engine is arranged to construct and restructure the D-fat according to at least one user-defined criterion.

20. Computer apparatus according to claim 19, wherein the data formatting engine is arranged to construct the D-fat first and then restructure the D-fat until the user-defined criterion is achieved.

21. Computer apparatus according to claim 18, wherein the data formatting engine is arranged to form two D-fats and to compare metrics for the two D-fats.

* * * * *